United States Patent
Hufschmied

(10) Patent No.: US 10,252,354 B2
(45) Date of Patent: Apr. 9, 2019

(54) CUTTER FOR ELECTRODE GRAPHITE AND FACE MILLING CUTTER FOR MACHINING OXIDE CERAMICS

(71) Applicant: Hufschmied Zerspanungssysteme GmbH, Bobingen (DE)

(72) Inventor: Ralph Hufschmied, Bobingen (DE)

(73) Assignee: Hufschmied Zerspanungssysteme GmbH, Bobingen (DE)

( * ) Notice: Subject to any disclaimer, the term of this patent is extended or adjusted under 35 U.S.C. 154(b) by 0 days.

(21) Appl. No.: 16/006,804

(22) Filed: Jun. 12, 2018

(65) Prior Publication Data

US 2018/0290219 A1 Oct. 11, 2018

Related U.S. Application Data

(63) Continuation of application No. PCT/EP2017/025148, filed on May 24, 2017.

(30) Foreign Application Priority Data

Jun. 9, 2016 (DE) .................. 10 2016 006 995

(51) Int. Cl.
*B23C 5/10* (2006.01)

(52) U.S. Cl.
CPC ...... *B23C 5/1009* (2013.01); *B23C 2210/086* (2013.01); *B23C 2210/326* (2013.01); *B23C 2220/605* (2013.01)

(58) Field of Classification Search
CPC ... B23C 5/10; B23C 5/1009; B23C 2210/084; B23C 2210/088; B23C 2210/0485;
(Continued)

(56) References Cited

U.S. PATENT DOCUMENTS 2,479,136 A * 8/1949 Schade .................. B23D 77/00
  408/223
2,814,094 A * 11/1957 Hanna .................... B23D 43/02
  407/13
(Continued)

FOREIGN PATENT DOCUMENTS

DE         10247715 A1    4/2004
DE    102005044015 A1    3/2007
(Continued)

OTHER PUBLICATIONS

Written Opinion of the European Patent Office in PCT/EP20217/025148 (from which this application claims priority) dated Oct. 10, 2017 and English-language machine translation thereof.
(Continued)

*Primary Examiner* — Will Fridie, Jr.
(74) *Attorney, Agent, or Firm* — Ewers & Hasselmann PLLC

(57) ABSTRACT

A cutter for electrode graphite which has a shank at one end and a tool tip at the other end, and flutes extending from the shank to the tool tip, which space machining lands apart from each other in the circumferential direction. The tool tip is formed as a ball head section, in which the machining lands have a rounded contour, extending along a ball head radius. At least one of the machining lands is a rough-machining land and at least one other of the machining lands is a fine-machining land. Each machining land has a circumferential working area with a cylindrical surface-segment-shaped shell surface, the working area of each rough-machining land is a circumferential file with teeth which are worked into the shell surface of the working area, and the working area of each fine-machining land exterior grooves extends with a twist about the tool axis.

15 Claims, 4 Drawing Sheets

(58) Field of Classification Search
CPC ...... B23C 2210/0486; B23C 2210/326; B23C 2210/40; B23C 2210/48; B23C 2220/60; B23C 2220/605
See application file for complete search history.

(56) References Cited

U.S. PATENT DOCUMENTS

| | | | | |
|---|---|---|---|---|
| 3,021,538 | A * | 2/1962 | Linley, Jr. | ............. B23B 27/065 |
| | | | | 408/218 |
| 3,058,199 | A | 10/1962 | Cave et al. | |
| 5,221,163 | A | 6/1993 | Nishimura | |
| 6,164,876 | A | 12/2000 | Cordovano | |
| 7,367,753 | B2 | 5/2008 | Maurer | |
| 9,849,522 | B2 | 12/2017 | Hufschmied | |
| 2010/0226726 | A1* | 9/2010 | Strasmann | ............. B23C 5/003 |
| | | | | 407/54 |
| 2013/0058734 | A1* | 3/2013 | Volokh | .................... B23B 51/08 |
| | | | | 408/223 |
| 2013/0136548 | A1 | 5/2013 | Takahashi et al. | |
| 2014/0161546 | A1* | 6/2014 | Shpigelman | ............. B23C 5/10 |
| | | | | 407/54 |
| 2015/0251253 | A1 | 9/2015 | Hufschmied | |
| 2016/0059325 | A1* | 3/2016 | Ota | ........................... B23C 5/16 |
| | | | | 407/54 |
| 2016/0089728 | A1* | 3/2016 | Archambault | ............ B23C 5/10 |
| | | | | 407/54 |

FOREIGN PATENT DOCUMENTS

| | | |
|---|---|---|
| DE | 202015106056 U1 | 11/2015 |
| DE | 102012019804 A1 | 10/2017 |
| EP | 2540427 A1 | 1/2013 |
| JP | H11347824 A | 12/1999 |
| WO | 2010061933 A1 | 4/2012 |

OTHER PUBLICATIONS

International Search Report of the European Patent Office in PCT/EP20217/025148 (from which this application claims priority) dated Oct. 10, 2017 and English-language translation thereof.

* cited by examiner

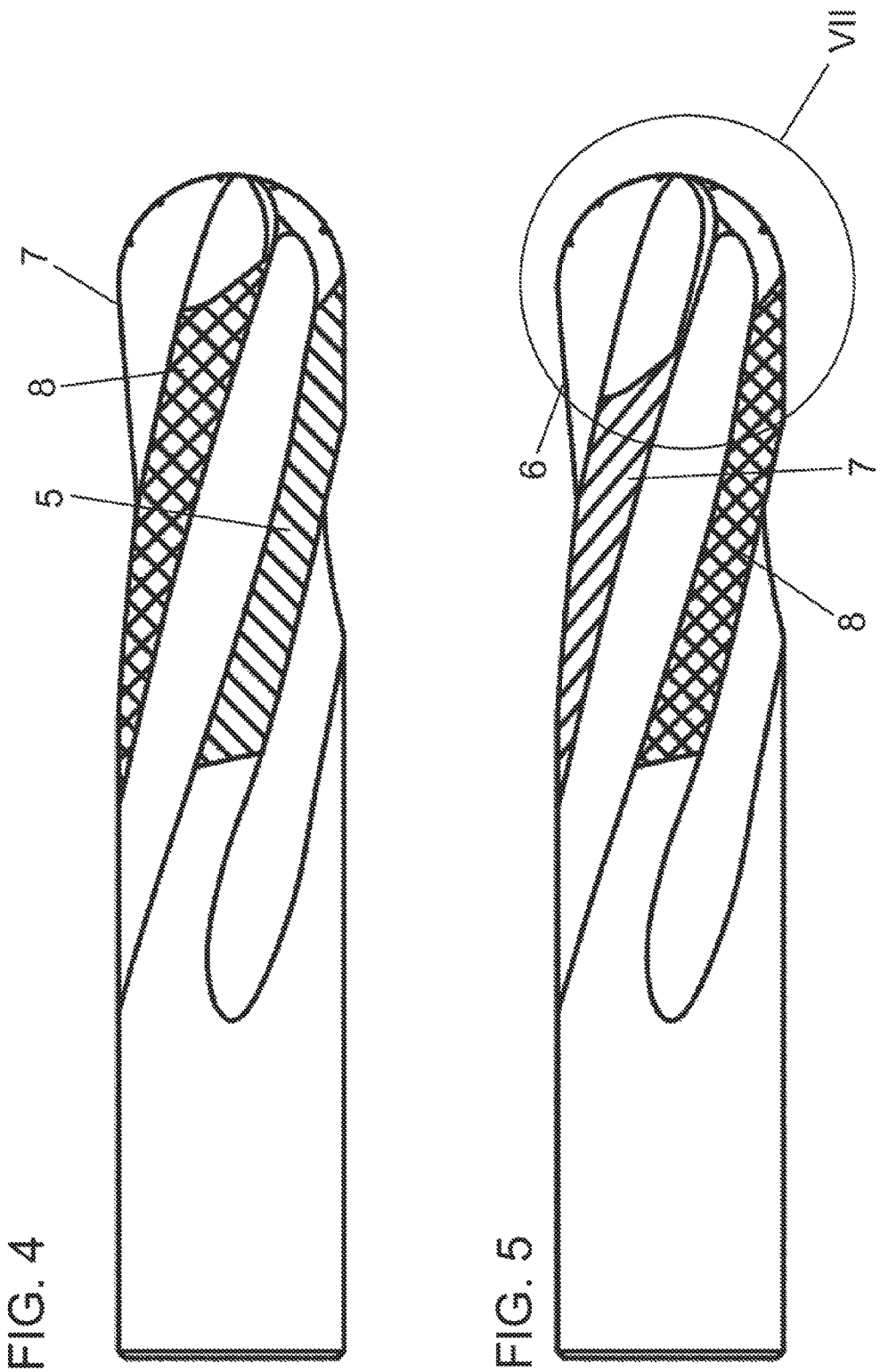

US 10,252,354 B2

CUTTER FOR ELECTRODE GRAPHITE AND FACE MILLING CUTTER FOR MACHINING OXIDE CERAMICS

CROSS REFERENCE TO RELATED APPLICATIONS

This application is a continuation application of international patent application PCT/EP2017/025148, filed May 24, 2017, designating the United States and claiming priority to German application 10 2016 006 995.3, filed Jun. 9, 2016, and the entire content of both applications is incorporated herein by reference.

TECHNICAL FIELD

The invention relates to a cutter for electrode graphite or a milling cutter for the machining of electrode graphite, and a face milling cutter for machining oxide ceramics.

BACKGROUND

Electrode graphite is usually synthetically produced graphite, which in addition to the well-known use in electric arc melting processes in steel mills is used in fields such as tool and mould making for EDM (spark erosion). Therein, the trend is towards ever more filigree structures of the workpieces to be manufactured with the graphite electrodes, thus leading to an increased demand for precision tools for processing electrode graphite.

The milling tools employed for machining electrode graphite therefore have high requirements in terms of both accuracy and fatigue strength, because graphite is a highly abrasive material that requires high cutting speeds during machining and due to the resulting abrasive dust grains causes rapid wear and thus rapid loss of the milling tool.

Cutting tools created especially for graphite machining therefore have corresponding tool geometries which are adjusted to a hardness of up to 90 Shore and high abrasion of the material due to the carbon grains produced during machining, while at the same time having tight manufacturing tolerances due to the fine graininess of the material (up to 0.5 µm is possible).

In general, therefore, the production of a graphite electrode takes place in two to three steps, wherein first rough-machining takes place in which as much material as possible is removed in as short a time as possible. It is then smoothed or finely processed, often with a pre-smoothing operation and a finishing operation, in which the exact final geometry of the electrode is then milled out of the electrode graphite blank.

European patent publication EP 2 540 427 B1 shows, for example, a cutter for electrode graphite with a cutting head in ball head geometry, as well as JP 08141816 A. This results in a high dimensional accuracy in the fine machining, even with complicated workpiece geometries. Cutters for electrode graphite with other tool geometries with a plurality of cutting plates on the front side or on the circumference of the milling cutting edge, on the other hand, are more suitable for the quickest possible rough machining, see DE 102 47 715 A1 for example with respect to the cutting plates on the end face of the milling cutter, and DE 10 2005 044 015 B4 with respect to tooth-like mounted cutting plates on the circumference of the milling cutter.

From the machining of other, less abrasive and brittle materials such as CFRP which are also difficult to machine, the concept is already known to provide on a single tool both roughing and smoothing cutting edges. For example, DE 10 2012 019 804 A1 shows a face milling cutter for machining fiber-reinforced materials such as CFRP, which includes pre-machining lands with teeth for roughing and post-machining lands provided with circumferential smoothing cutting edges provided on exterior grooves for smoothing or re-reaming. As a result, it is possible to rough-machine or coarsely work and to finish or finely machine with a single milling tool. During finishing, the thread ends of the fiber-reinforced plastic protruding from the workpiece after roughing are separated. One operation is thus saved. The principle is to distribute tasks on differently shaped cutting edges during loads or tasks occurring during machining.

This principle has also been adopted in a milling cutter for machining graphite, which is shown in U.S. Pat. No. 6,164,876. It shows a milling cutter with the ball head geometry necessary for the free-form machining on final accuracy of graphite workpieces, which milling cutter has four lands, two of which are designed as rough-machining lands with chip breaker grooves and two as fine-machining lands with cutting edges extending along the lands. While pre-fragmentation of the material takes place on the rough-machining lands with the local grooves introduced transversely to the tool axis, the cutting edges twisted together with the fine-machining lands around the tool axis in a right-twisted manner are used for post-reaming.

SUMMARY

On this basis, it is an object of the present invention to further improve a cutter for electrode graphite of the generic type with respect to the achievable machining accuracy, speed and durability. Furthermore, it is an object of the present invention to provide a corresponding face milling cutter for machining oxide ceramics.

This object is achieved in terms of the cutter for electrode graphite and in terms of the face milling cutter for machining oxide ceramics with the features as disclosed herein.

Therein, the cutter for electrode graphite according to an aspect of the invention has the generic ball head geometry and also the generic rough-machining and fine-machining lands, wherein the machining lands each have a circumferential working area with a cylindrical surface-segment-shaped shell surface, i.e., not only a conventional cutting edge facing the leading chip flute with a circular grinding chamfer which possibly still adjoins it on the rear side and is narrow or narrower compared to the circumferential working area. Further, the working area of each rough-machining land has a plurality of teeth, which teeth are worked into the cylindrical surface-segment-shaped shell surface in such a way that the working area of the rough-machining land is formed as a circumferential file, i.e., that the teeth are, in several circumferentially successive rows of teeth, worked into the shell surface of the working area. According to an aspect of the invention, the working area of each fine-machining land has a plurality of exterior grooves which are worked into the shell surface of the working area parallel to one another and with twist about the tool axis and with an incline to the flute leading the at least one fine-machining land, wherein the exterior grooves space apart exterior lands with a peripheral or circumferential cutting edge.

In contrast to mere chip breaker grooves, which interrupt an ordinary cutting edge along the cutting wedge adjacent to the leading chip flute so as to facilitate the removal of chips, the exterior lands behind the exterior grooves in the circumferential working area of the fine-machining land are thus sharpened or sharp, and each carry a circumferential cutting edge itself, which, as an alternative or in addition to an ordinary cutting edge on the cutting wedge adjacent to the leading flute, acts in a smoothing manner on the electrode graphite workpiece to be processed. Since the exterior grooves and thus the exterior cutting edges provided in the circumferential working area of the respective fine-machining land each extend at an angle relative to the leading flute, it is ensured that not only the foremost cutting edge along the leading flute engages the material to be machined, but all cutting edges along the exterior grooves in the circumferential working area contribute to the finishing. The twist around the tool axis ensures that the circumferential or exterior cutting edges come into engagement with the graphite to be machined at all. The circumferential or exterior cutting edges can each have a positive rake angle of 5 to 15°, in particular 8°. The circumferential working area on the fine-machining land is thus penetrated by parallel juxtaposed exterior grooves extending in a spiral segment-shaped manner, adjoined by a respective exterior land having a cutting edge along the groove and the land.

During the machining of graphite, hardly any plastic deformations occurs, but instead there are disruptive effects due to compressive stresses below the cutting edge and thus fine dust formation instead of chip formation occurs. Thereby, micro-cracks are generated in the material in a disruptive zone that precedes the cutting edge.

It was surprisingly recognized that the aforementioned design of the machining lands generally known from the processing of CFK is especially advantageous for the machining of dust-like machining, brittle-hard and abrasive electrode graphite. Because the many small teeth of the rough-machining lands do not only smash the material at the position to be machined, but also provoke very many, small micro-cracks in the graphite composite in front of the position to be machined, and, at the same time, are also very stable against wear. The smoothing edges along the exterior grooves of the smoothing or fine-machining lands then smooth the cutting surface machined by the respective leading rough-machining land and remove the material that has already started to break through the leading crack fronts during passing by, resulting in smooth surfaces overall even at high working speeds. Since the working areas of the lands, at which the cutting is performed, are shaped in a cylindrical surface-segment manner and not only include a cutting edge along the cutting wedge facing the leading chip flute, i.e., cover a certain arc length in the cross-section of the milling cutting edge, the forces are distributed over a larger area or on more points of attack, so that very good surface qualities are achieved. At the same time, there is a stiffening of the tool during machining.

According to a further aspect of the invention, the cutter for electrode graphite has a first number of the machining lands, in which the working area extends further to the tool tip than in a second or remaining number of the machining lands, in which the working area already ends further back, e.g. further than 2-5 mm, preferably further than 4 mm further back. It is thereby advantageous if the first number of the machining lands comprises such fine-machining land or those fine-machining lands which have left-twisted circumferential cutting edges and the second number of the machining lands encompasses such a machining land or those machining lands which have right-twisted circumferential cutting edges.

Overall, it is possible with such a cutter for electrode graphite to work out very fine contours with high operating speed from the electrode graphite, e.g., slim pins in the length-diameter ratio of 20:1 and larger. It also results in a subdivision of the milling tool for functional assignment of rough machining by teeth and fine machining by circumferential cutting edges into a ball head section which is mainly intended for fine machining and in which circumferential cutting edges used for smoothing merely exert pressure loads, and into a cutting section arranged behind it mainly for producing less filigree workpiece geometry with high machining speeds, in which both pulling, as well as pushing smoothing edges are provided.

Thus, the flutes can in principle be straight-grooved or also left-twisted. However, it is typical that the flutes have a right-hand twist, thus facilitating the removal of the removed dust-like graphite.

In order to distribute the cutting work on the peripheral smoothing edges of the fine-machining lands among the greatest possible cutting edge lengths and thus to increase the total cutting edge length which is already relatively long in comparison with conventional cutting edges, it is advantageous if the exterior grooves and thus the circumferential cutting edges twist with a relatively small spiral angle, for example less than 30°, around the tool axis.

Optionally, the working areas with the teeth or circumferential cutting edges extend on at least a part of the machining lands into the rounded ball head section, so that very fine contours can be worked out of the electrode graphite workpiece with the ball head section provided with the teeth or cutting edges. Due to the high cutting forces occurring in the region of the spherical head radius close to the tip, it is typical if the working areas of not all machining lands extend into the ball head section, but the working area merely continues on a number of the machining lands into the ball head section. As a result, the cutting forces on the spherical tool tip mainly used for fine machining can be kept within reasonable limits.

According to another aspect of the invention, all working areas of the rough-machining lands have teeth extend into the rounded ball head section, but not all working areas of the fine-machining lands have circumferential cutting edges.

This further development, especially in combination with an advantageous embodiment of the cutting edge for electrode graphite, offers advantages in which the cutting edge for electrode graphite has an even number of fine-machining lands, in particular two thereof, wherein the circumferential cutting edges in the working area of one half of fine-machining lands extend with right twist around the tool axis and the circumferential cutting edges in the working area of the other half the fine-machining lands with left twist. In this case, each of the fine-machining lands having left-twisted circumferential cutting edges can extend into the ball head section, whereas no fine-machining land having right-twisted circumferential cutting edges extends into the ball head section.

The fine-machining lands which are typically alternately provided with left- or right-twisted circumferential cutting edges have the advantageous effect that the workpiece is alternately loaded with pressure and subjected to tension, wherein the left-twisted circumferential cutting edges produce a pressure load and the right-twisted circumferential cutting edges produce a tensile load. The fact that fine-machining lands are provided with circumferential cutting edges running in opposite direction and thus opposite force application effects act on the workpiece, there is already a certain balance of the forces acting in and against the tool axis towards the tool tip on the workpiece and thus a more uniform machining (or actually: crumbling) and an improved surface quality.

Due to the fact that the pushing, i.e., left-twisted, circumferential smoothing edges are formed as far as the ball head section and the pulling, i.e., right-twisted, circumferential smoothing edges are formed only on the circumference, i.e., in the cutting section of substantially constant diameter adjoining the ball head section in the direction of the shank, a material property of the electrode graphite is utilized in order to be able to further increase the working speed even with filigree geometries, since the electrode graphite is much more pressure stable than tensile stable. The pushing or left-twisted circumferential cutting edges, which are provided in the ball head section, which is intended especially for fine machining, exert only a compressive load on the workpiece, which is much less relevant due to the pressure stability of graphite, than pulling or right-twisted smoothing or circumferential cutting edges would do in the ball head section intended for fine machining. The ball head section can therefore provide very smooth surfaces and the cutting section located further back can work very fast. However, it would also be conceivable, for example, to expand the tip-end section of the milling cutting edge provided for the production of fine structures in the direction of the shank to the rear or to merely use only a tip-side section of the ball head for this purpose.

It is advantageous in terms of a uniform distribution of cutting forces, if the cutter for electrode graphite has an even-numbered plurality of rough-machining lands which matches an even-numbered plurality of fine-machining lands, i.e., in the exemplary embodiment there are two rough-machining lands, and a respective fine-machining land follows a rough-machining land in an alternating manner over the circumference and vice versa. As soon as the teeth on the rough-machining land have pre-crushed the electrode material and have produced micro-cracks in the fronts leading in the cutting area, a fine-machining land then follows, the circumferential cutting edges of which remove the already loosened material. Due to the alternately pushing and pulling geometry of the fine-machining or smoothing lands, a balancing of the tensile and compressive loads acting on the workpiece takes place.

Although the working areas of some of the machining lands extend into the ball head section, i.e., they extend into a region near the tip in which their shell surface already merges into the spherical curvature of the ball head, they do not reach all the way to the tool tip however, according to a typical development. Instead, a conventional cutting edge is typically provided in the near-tip region of the ball head section which adjoins the working area, i.e., a cutting edge provided at the transition point of the radially outwardly facing circumferential side to the respective flank of the machining land facing the respective leading flute. However, it would also be conceivable to provide sharp cutting edges on the cutting wedge of the respective rough- or fine-machining land facing the leading flute also along the working areas. According to another aspect of the invention, the lands include chip breaker grooves on the cutting edges in the region near the tip of the ball head section in front of the respective working area distributed over the ball head radius in order to reduce the cutting pressure.

According to a further aspect of the invention, the machining lands are distributed equidistantly over the tool circumference. According to a yet another aspect of the invention, the working areas of the machining lands respectively extend at least in the cutting section behind the ball head section over an arc length which is greater than or equal to the total arc length divided by three times, preferably twice, the number of flutes.

The teeth on the coarse or rough machining lands can typically have a polygonal, in particular diamond-shaped base surface and typically a pyramidal shape. The height of the teeth corresponds to the depth of the exterior grooves of the fine-machining lands, which is typically equal on all fine-machining lands. Particularly typical for the height of the teeth is a value corresponding to 0.5 to 1.5 times the depth of the exterior grooves, in particular a value corresponding to the depth of the exterior grooves.

In order to further supplement the intersection geometry on the smoothing or fine-machining lands with left- and right-twisted exterior grooves with regard to an alternately pulling and pressing load of the workpiece during milling, or as an alternative thereto, the diamond-shaped base area of the teeth can each include a longitudinal diagonal extending predominantly along the tool axis and a transverse diagonal extending predominantly transversely to the tool axis, wherein the longitudinal diagonals of the teeth on the one half of the rough-machining lands extend with left twist around the tool axis and the longitudinal diagonals of the teeth on the other half of the roughing lands extend with right twist. Thus, there is a pushing or pressing geometry on the rough-machining lands with the left-twisted longitudinal diagonals, and a pulling geometry on the rough-machining lands with the right-hand twist, i.e., in total the same advantageous effect that is already observed in the smoothing edges, namely a load distribution, but now when introducing micro-cracks and shattering the material.

It is understood that it is advantageous for the load distribution on the workpiece, and thus for the achievable accuracy and operating speed, if the ball head section converges with its largest outer diameter in the axial direction substantially constant with this diameter to the cutting section extending to the shank, and the ball head section, the cutting section and the shank are all made integrally from a single piece of material. For example, soldered or otherwise multi-piece manufactured tools do not have the necessary loading capacity for the machining of electrode graphite. Rather, it is advantageous if the material from which the cutter for electrode graphite is made is a hard metal, which may be further provided with a hard coating to counter the high abrasiveness of the electrode graphite. A polycrystalline diamond or cubic boron nitride can be considered for example as a material for the hard material layer.

The invention has been made especially with regard to a face milling cutter for machining electrode graphite. On the basis of the advantages that result from the interaction of the tool geometry according to the invention with the material properties of the brittle-hard, powder-chipping electrode graphite, it is assumed that the milling cutter is also well-suited for the cutting of other brittle, powder-chipping materials. The invention therefore also relates to a face milling cutter for the machining oxide ceramics, in particular of dental zirconium dioxide ceramics or other powder-chipping material such as cast polyurethane, which has the features of the cutter for electrode graphite according to one of the claims.

BRIEF DESCRIPTION OF THE DRAWINGS

The invention will now be described with reference to the drawings wherein:

FIGS. 2 to 5 show side views of the cutter for electrode graphite shown in FIG. 1 in 90° increments during one revolution;

DESCRIPTION OF EXEMPLARY EMBODIMENTS

Figure 1:
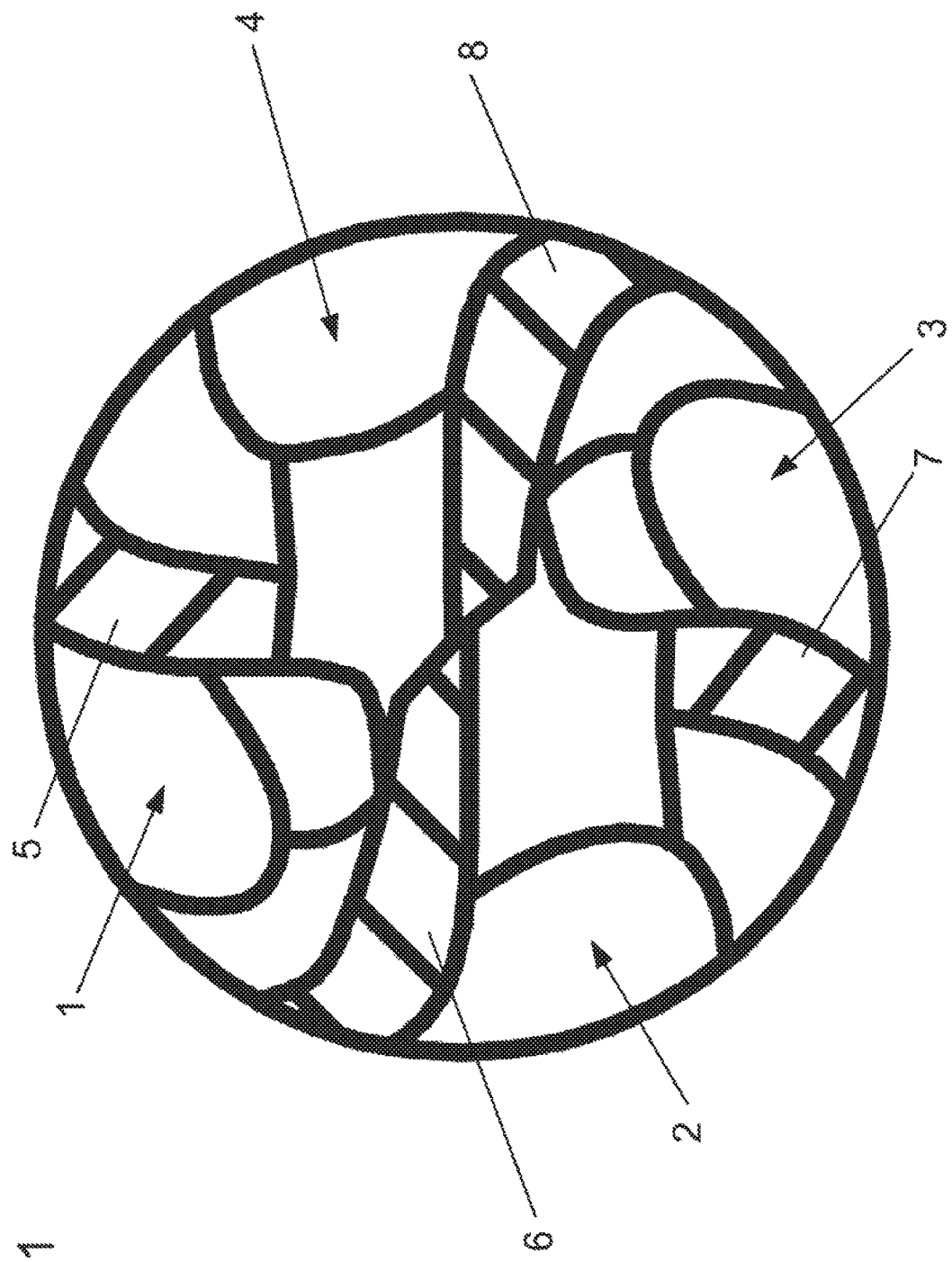
FIG. 1 shows an enlarged front view of the tool tip of a cutter for electrode graphite according to an exemplary embodiment of the invention.
Figures 2, 3:
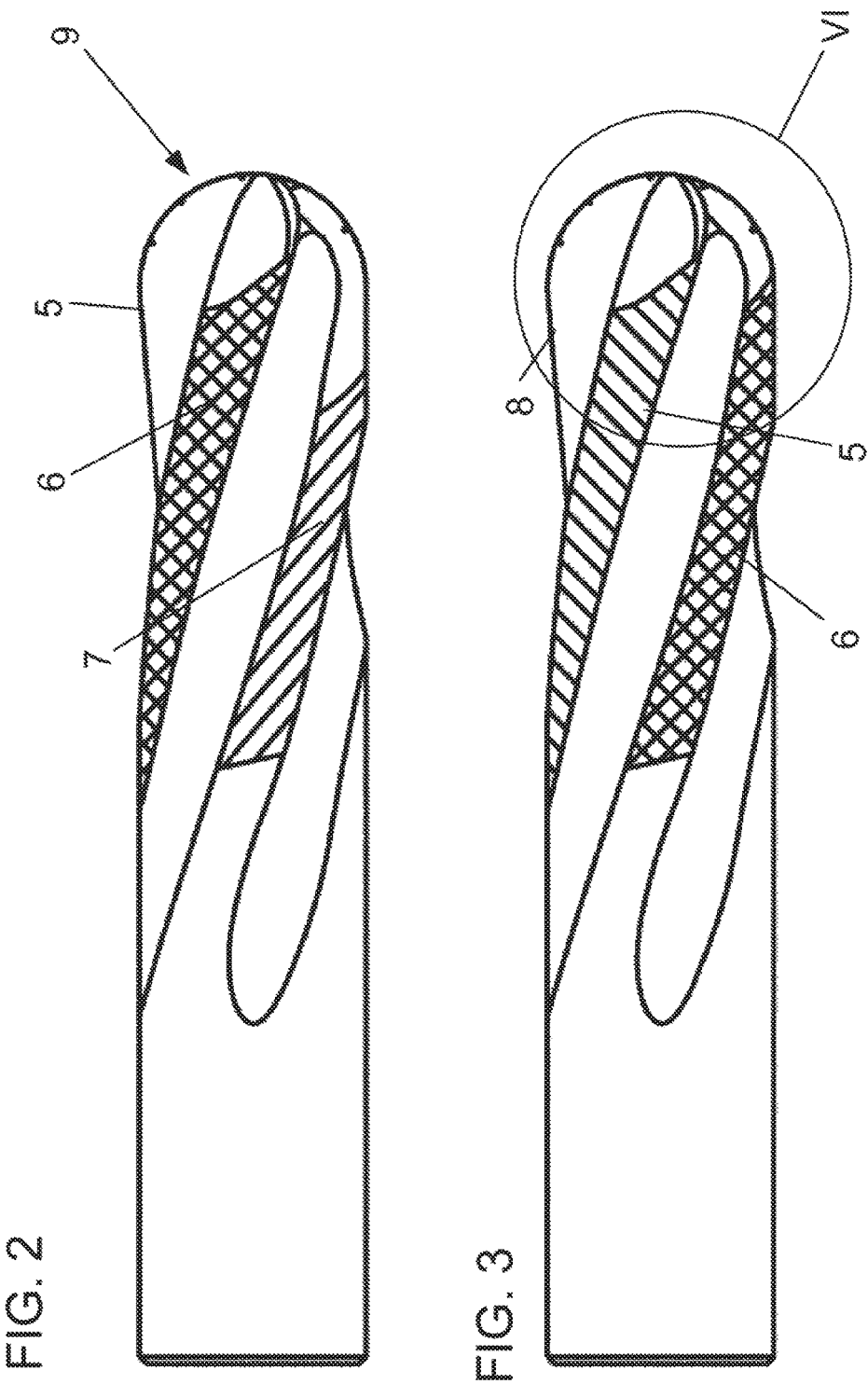

The cutter for electrode graphite shown in the drawings includes four equidistant spaced flutes 1, 2, 3, 4, as shown in particular in FIG. 1, which mutually space machining lands 5, 6, 7, 8 in the circumferential direction, which lands are positioned around a core segment of the cutter for electrode graphite. As can be seen in FIGS. 2-5, two of the machining lands 5, 6, 7, 8 are formed as rough-machining lands 6, 8 with teeth 10, 11 forming a circumferential file, wherein the other two are fine-machining lands 5, 7 with circumferential exterior grooves which space exterior lands from each other, which each carry a circumferential cutting edge 12, 13. The teeth 10, 11 and the circumferential cutting edges 12, 13 are denoted in FIGS. 6 and 7 and are each disposed in a circumferential working area which is enveloped by an (imaginary) cylindrical shell or mantle.

Therein, the cutter for electrode graphite has a tool tip designed as a ball head section 9, in which the machining lands 5, 6, 7, 8 have an outer contour following a ball head radius. Further, on the rough-machining lands 6, 8, the working areas with the teeth 10, 11 extend into the ball head section 9. While one of the working areas with left-twisted, i.e., pressing, smoothing edges on the post-machining land 5 extends into the ball head section 9, the working area with right-twisted smoothing edges 13 on the other fine-machining land 7 ends already before the ball head section 9, i.e., further back. This avoids that in the ball head section mainly used to work out filigree geometries a strong pulling load is applied to the electrode graphite, which is much more pressure-stable than tension-stable, so that filigree geometries can be produced with the ball head section.

Figure 7:
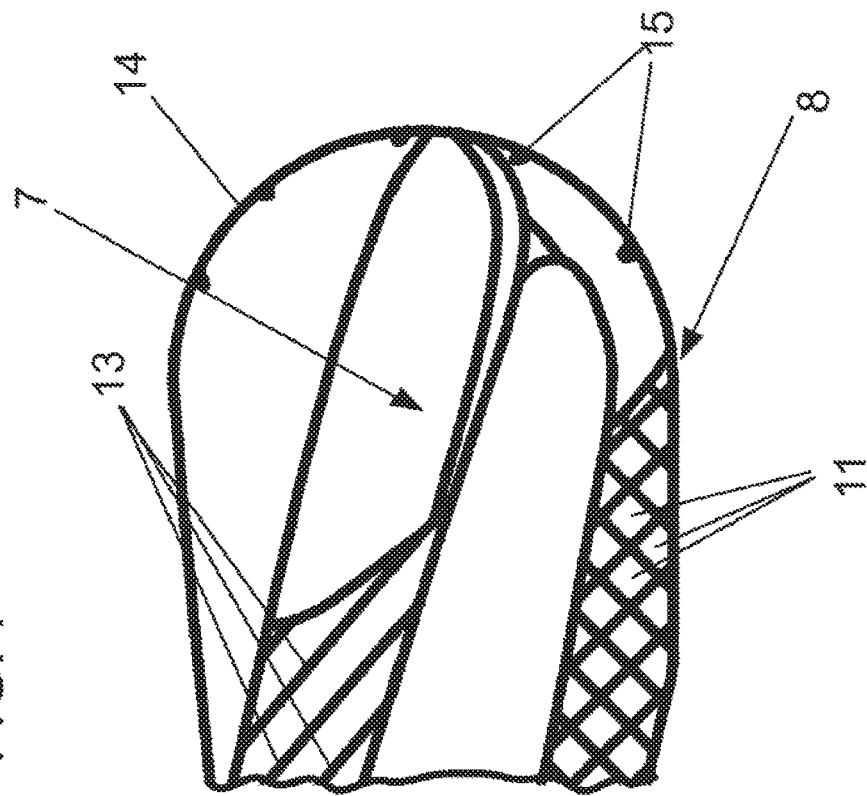
FIG. 7 shows detail VII in FIG. 5.
Figure 6:
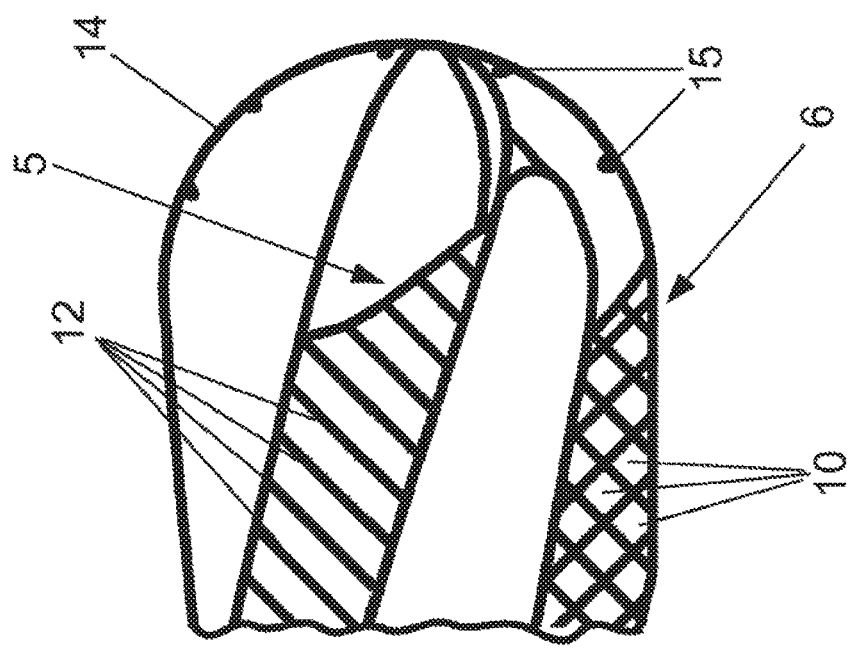
FIG. 6 shows detail VI in FIG. 3.

In the ball head section 9, however, in the areas adjoining the working areas of the machining lands 5, 6, 7, 8 at the tip side, the edges at the transition point extending along the ball head radius from the circumferential side to each leading flute are sharp, i.e., formed as cutting edges 14, as also shown in the FIGS. 6 and 7. The cutting edges 14 are additionally provided with chip breaker grooves 15 in order to reduce the cutting pressure.

It is understood that the foregoing description is that of the exemplary embodiments of the invention and that various changes and modifications may be made thereto without departing from the spirit and scope of the invention as defined in the appended claims.

What is claimed is:

1. A cutter for electrode graphite, comprising:
a shank at one end and a tool tip at the other end; and
flutes extending from the shank to the tool tip, which space machining lands apart from each other in the circumferential direction,
wherein:
the tool tip is formed as a ball head section, in which the machining lands have a rounded contour, extending in particular along a ball head radius,
at least one of the machining lands is designed as a rough-machining land and at least one other of the machining lands as a fine-machining land,
each of the machining lands has a circumferential working area with a cylindrical surface-segment-shaped shell surface,
the working area of each rough-machining land is designed as a circumferential file with a plurality of teeth which are worked into the shell surface of the working area, and
the working area of each fine-machining land has a plurality of exterior grooves extending with a twist about a tool axis, which are worked into the shell surface of the working area parallel to each other and at an angle relative to the flute leading the at least one fine-machining land,
the exterior grooves space apart exterior lands which each have a circumferential cutting edge, and
the working areas on a first part of the machining lands reach further to the tool tip than on a second part of the machining lands, in which the working area of the respective machining land ends further back.

2. The cutter for electrode graphite according to claim 1, wherein the flutes extend with a right-hand twist about the tool axis.

3. The cutter for electrode graphite according to claim 1, wherein on at least a number of the machining lands, the working area there, which comprises teeth or circumferential cutting edges, extends into the rounded ball head section.

4. The cutter for electrode graphite according to claim 3, wherein on a remaining number of the machining lands the working area there does not extend into the rounded ball head section.

5. The cutter for electrode graphite according to claim 1, wherein all working areas of the rough-machining lands which comprise teeth extend into the rounded ball head section and at least not all working areas of the fine-machining lands which comprises circumferential cutting edges extend into the rounded ball head section.

6. The cutter for electrode graphite according to claim 1, wherein it has an even number of fine-machining lands, wherein the circumferential cutting edges extend around the tool axis in the working area of the one half of the fine-machining lands with right-hand twist and the circumferential cutting edges extend in the working area of the other half of the fine-machining lands with left-hand twist around the tool axis.

7. The cutter for electrode graphite according to claim 6, wherein the even-numbered plurality of fine-machining lands is equal to two.

8. The cutter for electrode graphite according to claim 6, wherein in each fine-machining land having the working area with the left-twisted circumferential cutting edges the working area extends into the ball head section, but not in any fine-machining land having the working area with the right-twisted circumferential cutting edges.

9. The cutter for electrode graphite according to claim 6, wherein the first number of the machining lands comprises the half of the fine-machining lands having the working area with the left-twisted circumferential cutting edges, and the remaining or second part of the machining lands comprises the half of the fine-machining lands having the working area with the right-twisted circumferential cutting edges.

10. The cutter for electrode graphite according to claim 1, wherein it has an even-numbered plurality of rough-machining lands, wherein the same plurality is formed of the machining lands as rough-machining lands and as fine-machining lands, and wherein each rough-machining land is trailed by one of the fine-machining lands.

11. The cutter for electrode graphite according to claim 10, wherein the even-numbered plurality of rough-machining lands is equal to two.

12. The cutter for electrode graphite according to claim 1, wherein the machining lands, at least in one region of the ball head section adjoining the respective working area on the tip side, respectively comprise a cutting edge in the entire ball head section or also in the further course of the flutes at the transition from their radially outwardly directed circumferential sides to their flanks facing the respective leading flute, wherein at least one, preferably all machining lands comprise chip breaker grooves on the cutting edges in the tip-side region of the ball head section distributed over the ball head radius.

13. The cutter for electrode graphite according to claim 1, wherein the teeth each have a polygonal, in particular diamond-shaped base surface and preferably a pyramidal shape, wherein the height of the teeth of each rough-machining land corresponds in respect of magnitude to the depth of the exterior grooves of each fine-machining land, in particular 0.5 to 1.5 times the depth of the exterior grooves and, for example, equal to the depth of the exterior grooves.

14. The cutter for electrode graphite according to claim 13, wherein the diamond-shaped base surface of the teeth each have a longitudinal diagonal extending predominantly along the tool axis and a transverse diagonal extending predominantly transversely to the tool axis, wherein the longitudinal diagonals of the teeth extend on the one half of the rough-machining lands with left twist around the tool axis and the longitudinal diagonals of the teeth on the other half of the rough-machining lands with right twist.

15. A face milling cutter for machining oxide ceramics, in particular dental zirconium oxide ceramics or other powder-chipping machining materials such as polyurethane casting, comprising the features of the cutter for electrode graphite according to claim 1.

* * * * *